United States Patent
Boes et al.

(10) Patent No.: US 7,871,129 B2
(45) Date of Patent: Jan. 18, 2011

(54) SEAT ASSEMBLY HAVING AN ADJUSTABLE HEAD RESTRAINT ASSEMBLY

(75) Inventors: Klaus Boes, Allershausen (DE); Markus Schmid, Allershausen (DE); Thomas Frank, Allershausen (DE); Achim Tscherbner, Allershausen (DE)

(73) Assignee: Lear Corporation, Southfield, MI (US)

( * ) Notice: Subject to any disclaimer, the term of this patent is extended or adjusted under 35 U.S.C. 154(b) by 156 days.

(21) Appl. No.: 12/325,386

(22) Filed: Dec. 1, 2008

(65) Prior Publication Data

US 2009/0146479 A1    Jun. 11, 2009

Related U.S. Application Data

(60) Provisional application No. 60/992,503, filed on Dec. 5, 2007.

(51) Int. Cl.
*B60N 2/48* (2006.01)

(52) U.S. Cl. ................. 297/404; 297/408; 297/409; 297/410

(58) Field of Classification Search ............. 297/404, 297/408, 409, 410
See application file for complete search history.

(56) References Cited

U.S. PATENT DOCUMENTS

| 3,563,602 | A | | 2/1971 | Ohta et al. |
| 3,608,965 | A | * | 9/1971 | Cziptschirsch et al. ....... 297/410 |
| 4,191,422 | A | * | 3/1980 | Inasawa et al. ........... 297/409 X |
| 4,265,482 | A | | 5/1981 | Nishimura et al. |
| 4,668,014 | A | * | 5/1987 | Boisset ................. 297/408 |
| 4,671,573 | A | | 6/1987 | Nemoto et al. |
| 4,674,797 | A | | 6/1987 | Tateyama |
| 4,762,367 | A | * | 8/1988 | Denton ................ 297/409 |
| 4,830,434 | A | | 5/1989 | Ishida et al. |
| 4,923,250 | A | | 5/1990 | Hattori |
| 5,445,434 | A | | 8/1995 | Kohut |
| 5,669,668 | A | * | 9/1997 | Leuchtmann ............ 297/408 |
| 6,082,817 | A | | 7/2000 | Muller |
| 6,364,455 | B1 | | 4/2002 | Yang et al. |
| 6,390,558 | B2 | | 5/2002 | Fischer et al. |
| 6,688,697 | B2 | | 2/2004 | Baumann et al. |
| 6,715,829 | B2 | | 4/2004 | Svantesson et al. |
| 6,767,064 | B2 | | 7/2004 | Veine et al. |

(Continued)

FOREIGN PATENT DOCUMENTS

DE    19603911 A1    8/1997

(Continued)

OTHER PUBLICATIONS

German Patent Office, Office Action for the corresponding German Patent Application No. 10 2008 060 641.3 mailed Dec. 31, 2009.

(Continued)

*Primary Examiner*—Rodney B. White
(74) *Attorney, Agent, or Firm*—Brooks Kushman P.C.

(57) ABSTRACT

A seat assembly having a headrest for supporting the head of a seat occupant. The seat assembly includes a seat back, a support post disposed on the seat back, a headrest being moveably disposed on the support post, and a latch mechanism moveable between a latched position and an unlatched position. The headrest is simultaneously moveable in multiple directions when the latch mechanism is disposed in the unlatched position.

20 Claims, 4 Drawing Sheets

U.S. PATENT DOCUMENTS

| | | | |
|---|---|---|---|
| 6,805,411 | B2 | 10/2004 | Gramss et al. |
| 6,880,890 | B1 * | 4/2005 | DeBrabant .................. 297/408 |
| 6,899,395 | B2 | 5/2005 | Yetukuri et al. |
| 6,910,740 | B2 * | 6/2005 | Baker et al. .................. 297/408 |
| 6,983,995 | B1 | 1/2006 | Veine et al. |
| 7,048,336 | B2 | 5/2006 | Mawbey et al. |
| 7,070,235 | B2 | 7/2006 | Schilling et al. |
| 7,073,863 | B1 | 7/2006 | Low et al. |
| 7,111,901 | B2 | 9/2006 | Schlierf et al. |
| 7,137,668 | B2 | 11/2006 | Kreitler |
| 7,144,083 | B2 | 12/2006 | List et al. |
| 7,195,313 | B2 | 3/2007 | Hippel et al. |
| 7,232,187 | B1 | 6/2007 | Sundararajan et al. |
| 7,316,455 | B2 | 1/2008 | Metz et al. |
| 7,427,108 | B2 * | 9/2008 | Hermansson et al. ....... 297/408 |
| 7,431,400 | B2 * | 10/2008 | Brawner .................... 297/408 |
| 7,562,936 | B1 * | 7/2009 | Veine et al. ................. 297/410 |
| 7,669,932 | B1 * | 3/2010 | Gronninger et al. ......... 297/408 |
| 7,735,929 | B2 | 6/2010 | Veine et al. |
| 7,758,127 | B2 * | 7/2010 | Bokelmann et al. ......... 297/410 |
| 2001/0028191 | A1 | 10/2001 | Lance |
| 2001/0040396 | A1 | 11/2001 | Kreuels et al. |
| 2003/0103140 | A1 | 6/2003 | Watkins |
| 2004/0108766 | A1 * | 6/2004 | Baker et al. .................. 297/408 |
| 2004/0195894 | A1 | 10/2004 | Pal et al. |
| 2005/0077762 | A1 | 4/2005 | Kraemer et al. |
| 2005/0116515 | A1 | 6/2005 | Schlierf et al. |
| 2005/0146190 | A1 | 7/2005 | Taatjes |
| 2006/0071518 | A1 | 4/2006 | Hippel et al. |
| 2006/0186720 | A1 | 8/2006 | Linardi et al. |
| 2006/0214491 | A1 | 9/2006 | Metz et al. |
| 2006/0226688 | A1 | 10/2006 | Terada et al. |
| 2006/0250017 | A1 * | 11/2006 | Otto et al. .................... 297/410 |
| 2007/0164593 | A1 * | 7/2007 | Brockman .................. 297/408 |
| 2007/0170766 | A1 * | 7/2007 | Brawner .................... 297/408 |
| 2007/0216211 | A1 | 9/2007 | Mori |
| 2007/0284925 | A1 | 12/2007 | Balensiefer |
| 2008/0001456 | A1 | 1/2008 | Muller et al. |
| 2008/0203801 | A1 * | 8/2008 | Jammalamadaka et al. . 297/408 |
| 2008/0277989 | A1 * | 11/2008 | Yamane et al. .............. 297/408 |
| 2009/0058162 | A1 * | 3/2009 | Boes et al. .............. 297/410 X |
| 2009/0058163 | A1 | 3/2009 | Bokelmann et al. |
| 2009/0184556 | A1 | 7/2009 | Bokelmann et al. |
| 2009/0243364 | A1 * | 10/2009 | Brunner et al. ............. 297/408 |
| 2010/0019559 | A1 * | 1/2010 | Smith ........................ 297/408 |
| 2010/0045090 | A1 * | 2/2010 | Brunner et al. ............. 297/408 |
| 2010/0219670 | A1 * | 9/2010 | Jammalamadaka et al. . 297/408 |

FOREIGN PATENT DOCUMENTS

| | | |
|---|---|---|
| DE | 19714283 A1 | 11/1997 |
| DE | 19632560 A1 | 2/1998 |
| DE | 19737706 C1 | 1/1999 |
| DE | 10035972 A1 | 2/2001 |
| DE | 10043923 A1 | 4/2002 |
| DE | 10 2004 005 695 | 8/2004 |
| DE | 10312517 A1 | 10/2004 |
| DE | 102004030933 B3 | 8/2005 |
| DE | 102004055986 A1 | 6/2006 |
| DE | 102005020276 B3 | 9/2006 |
| DE | 10 2006 015 785 | 10/2006 |
| DE | 102007048152 B3 | 1/2009 |
| DE | 102008060641 A1 | 6/2009 |
| EP | 1717099 A2 | 11/2006 |
| FR | 2 852 066 | 9/2004 |
| GB | 2302706 A | 1/1997 |
| GB | 2340744 | 3/2000 |
| GB | 2418850 A | 4/2006 |
| WO | 2004089688 | 10/2004 |
| WO | 2007073034 | 6/2007 |

OTHER PUBLICATIONS

U.S. Appl. No. 12/194,351, filed Aug. 19, 2008.

* cited by examiner

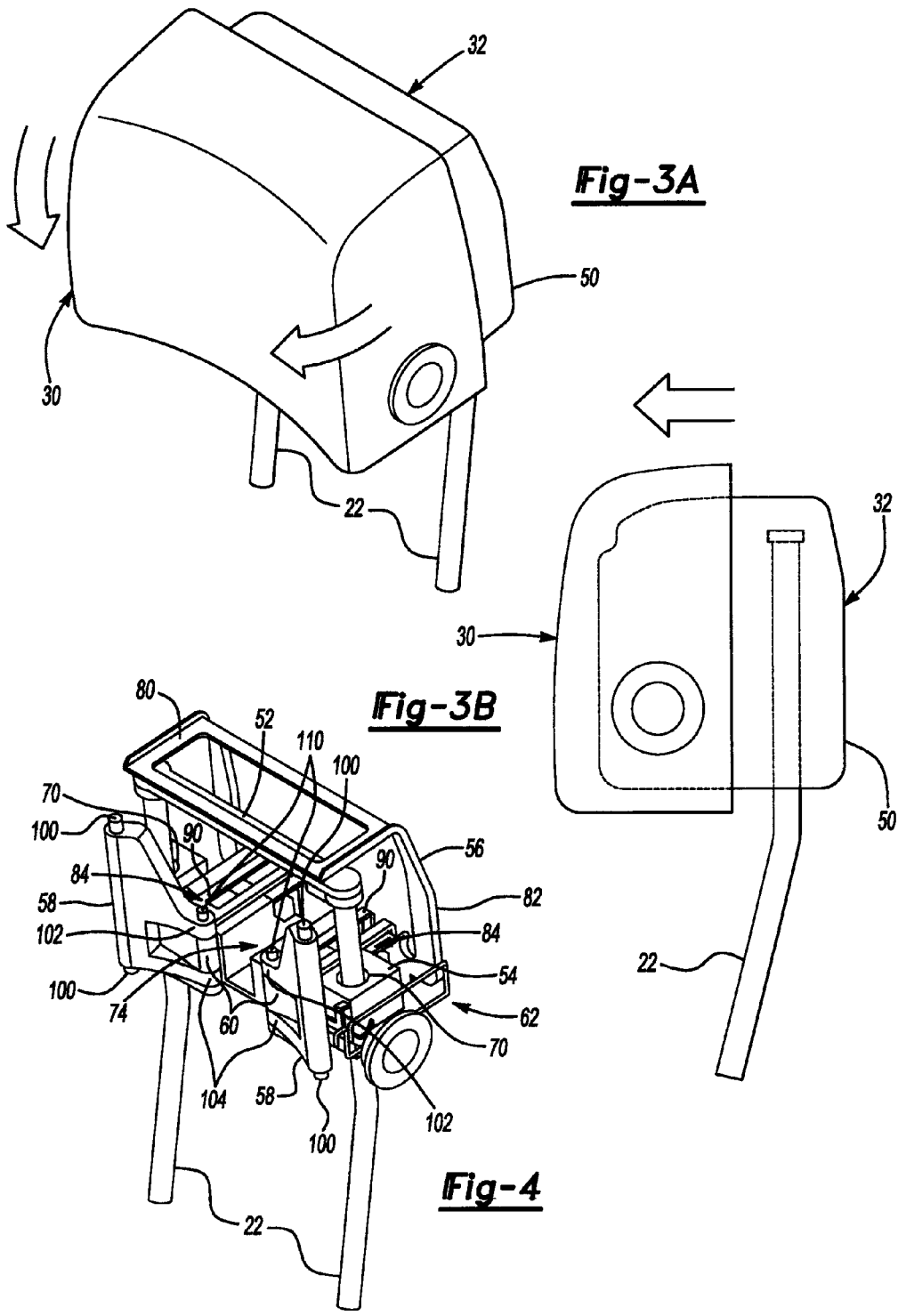

US 7,871,129 B2

SEAT ASSEMBLY HAVING AN ADJUSTABLE HEAD RESTRAINT ASSEMBLY

CROSS-REFERENCE TO RELATED APPLICATIONS

This application claims the benefit of U.S. provisional application Ser. No. 60/992,503 filed Dec. 5, 2007.

BACKGROUND OF THE INVENTION

Field of the Invention

The present invention relates to a seat assembly having an adjustable head restraint assembly.

SUMMARY OF THE INVENTION

In at least one embodiment, a seat assembly is provided. The seat assembly includes a seat back, a support post fixedly disposed on the seat back, a headrest for supporting the head of a seat occupant, and a latch mechanism. The headrest is moveably disposed on the support post. The latch mechanism is moveable between a latched position and an unlatched position. The headrest is simultaneously moveable in multiple directions when the latch mechanism is disposed in the unlatched position.

In at least one other embodiment, a seat assembly is provided. The seat assembly includes a seat back, a support post disposed on the seat back, a headrest moveably disposed on the support post, and a latch mechanism. The latch mechanism is at least partially disposed in the headrest and is moveable between a latched position and an unlatched position. The latch mechanism includes a first coupling member, a second coupling member that engages the first coupling member, and a third coupling member that engages the second coupling member. The second coupling member inhibits movement of the headrest along the support post and the third coupling member inhibits movement of the headrest away from the support post when the latch mechanism is in the latched position.

In at least one other embodiment, a seat assembly is provided. The seat assembly includes a seat back, a support post disposed on the seat back, a latch mechanism moveable between a latched position and an unlatched position, and a headrest for supporting the head of a seat occupant. The headrest includes a front portion moveably coupled to the rear portion. The rear portion has a lower traverse member moveably disposed on the support post, a support frame disposed on the lower traverse member, a pivot member moveably disposed on the support frame, and a support linkage rotatably disposed on the support post and coupled to the pivot member. The lower traverse member, pivot member and support linkage do not move when the latch mechanism is disposed in the latched position. The headrest is simultaneously moveable in multiple directions when the latch mechanism is disposed in the unlatched position.

BRIEF DESCRIPTION OF THE DRAWINGS

FIGS. 3a and 3b are perspective and side views of the head restraint assembly disposed in an extended position.

FIG. 4 is a fragmentary perspective view of the head restraint assembly disposed in the retracted position.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figures 1, 2A, 2B:
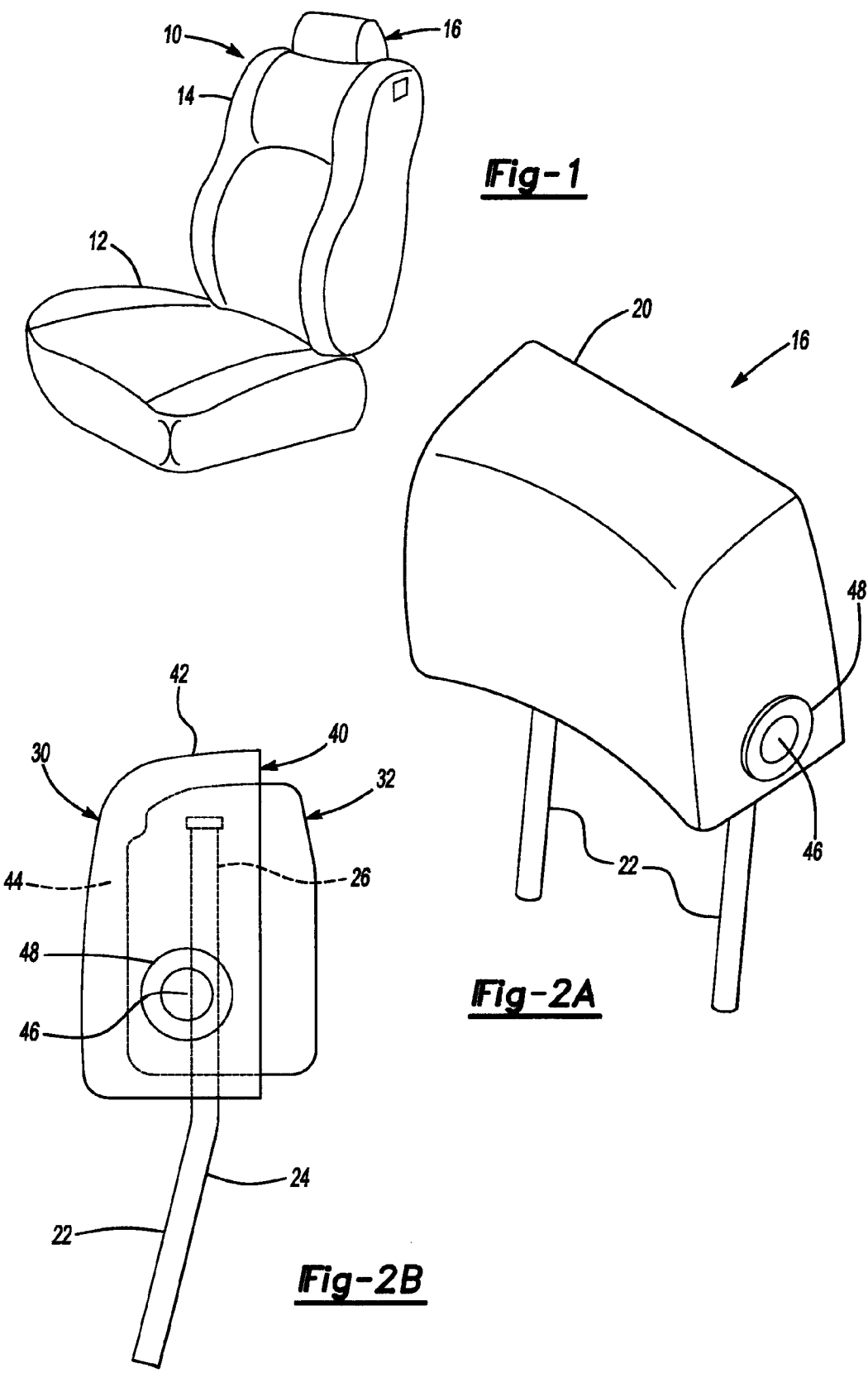
FIG. 1 is a perspective view of a seat assembly.
FIGS. 2a and 2b are perspective and side views of a head restraint assembly disposed in a retracted position.

Referring to FIG. 1, an exemplary seat assembly 10 is shown. The seat assembly 10 may be configured for use in a vehicle, such as a motor vehicle like a car or truck.

The seat assembly 10 may include a seat bottom 12 and a seat back 14. The seat bottom 12 may be configured to be mounted on a support surface, such as a floor pan of a vehicle. The seat back 14 may be pivotally disposed on the seat bottom 12 and may include a head restraint assembly 16.

Referring to FIGS. 2a and 2b, the head restraint assembly 16 may include a headrest 20 and one or more support posts 22. The headrest 20 may be moveably disposed on the support posts 22 as will be described in more detail below. The support posts 22 may be disposed on the seat back 14 may be made of any suitable material or materials, such as a metal like an aluminum alloy.

Figure 7:
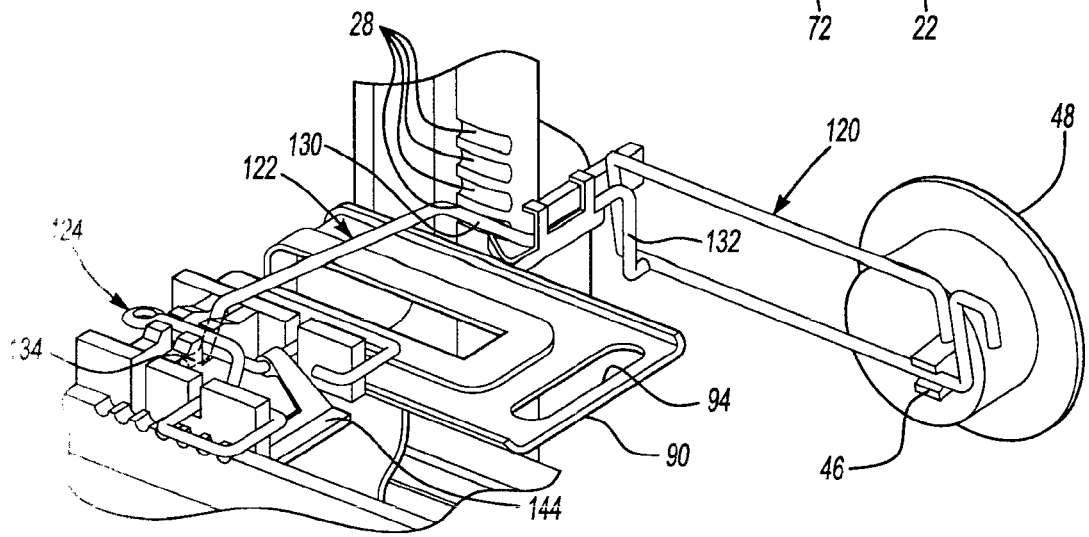
FIG. 7 is a fragmentary perspective view of a portion of the head restraint assembly showing a latch subsystem.

The support posts 22 may include a lower portion 24 and an upper portion 26. The lower and upper portions 24, 26 may be configured as generally linear cylindrical tubes. The lower portion 24 may extend through the top of the seat back 14. In addition, the lower portion 24 may be fixedly mounted to a structural frame of the seat back 14 such that the support posts 22 do not move with respect to the seat back 14. The upper portion 26 may or may not be coaxially disposed with the lower portion 24. In at least one embodiment, the upper portion 26 may extend at an angle from the lower portion 24, such as at an obtuse angle as shown in FIG. 2b. The upper portion 26 of at least one support post 22 may include a plurality of notches 28. The notches 28, which are best shown in FIG. 7, may be spaced apart from each other and may provide predetermined positions at which the headrest 20 may be positioned along the support posts 22.

The headrest 20 may be configured to support the head of an occupant of the seat assembly 10. The headrest 20 may include a front portion 30 and a rear portion 32. The front portion 30 may be moveable with respect to the rear portion 32 as will be discussed in more detail below.

The front portion 30 may be face toward the head of a seat occupant. In at least one embodiment, the front portion 30 may have an opening 40 that faces toward and may at least partially receive the rear portion 32. The front portion 30 may include a trim cover 42 that covers its visible exterior surface. The trim cover 42 may be made of any suitable material or materials, such as a fabric, vinyl, leather, or the like. The trim cover 42 may cover a cushion 44 that may be disposed under at least a portion of the trim cover 42. A support frame may also be provided that supports the trim cover 42 and/or the cushion 44.

The front portion 30 may also include an input device, such as a button 46. In the embodiment shown in FIGS. 2a and 2b, the button 46 extends at least partially through a hole in a side of the front portion 30. A bezel 48 may be provided that extends at least partially around the button 46 to facilitate mounting and help provide a desired aesthetic appearance. The button 46 may be part of a latch subsystem that will be described in more detail below.

Movement of the front portion 30 with respect to the rear portion 32 is highlighted by comparing FIGS. 2a and 2b with FIGS. 3a and 3b. The front portion 30 can move in two different ways. First, the front portion 30 may move substantially linearly toward or away from the rear portion 32 as is best shown in FIGS. 2b and 3b and represented by the horizontal straight arrow line in FIG. 3b. Second, the front portion 30 may flex or fold when it moves toward or away from the rear portion 32. For example, lateral sides of the front portion 30 may move angularly, such as by flexing or folding forward and inward toward the center of the front portion 30. In at least one embodiment, at least a portion of a front surface of the front portion 30 may be generally planar when in the retracted position and may become curved or more U-shaped when in the extended position. The front portion may simultaneously move away from the rear portion 32 and fold angularly as will be described in more detail below.

Figure 5:
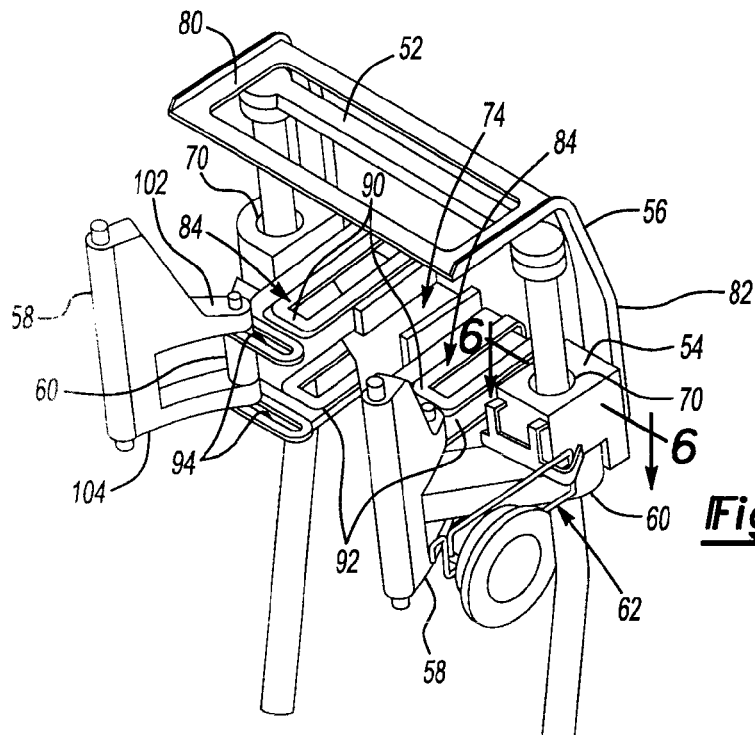
FIG. 5 is a fragmentary perspective view of the head restraint assembly disposed in the extended position.

Referring to FIGS. 4 and 5, the rear portion 32 and internal components of the head restraint assembly 16 are shown in more detail. The rear portion 32 may include an outer shell or cover 50 that covers at least a portion of its visible exterior surface and at least partially defines an opening that faces toward the front portion 30. Internal components that may be concealed by the outer cover 50 may include an upper traverse member 52, a lower traverse member 54, a support frame 56, a pivot member 58, a support linkage 60, and a latch subsystem 62.

The upper traverse member 52 may be fixedly disposed on one or more support posts 22. For instance, the upper traverse member 52 may be disposed at or near the end of the upper portion 26 of each support post 22. As such, the upper traverse member 52 may help align the support posts 22 and provide structural reinforcement. In at least one embodiment, the upper traverse member 52 may include one or more holes that at least partially receives a support post 22. The upper traverse member 52 may be generally linear and may be secured in any suitable manner, such as by an interference fit or with a fastener or mating feature.

Figure 6:
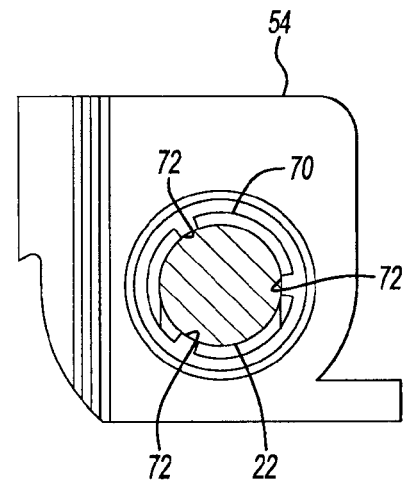
FIG. 6 is a section view of a portion of the head restraint assembly along line 6-6.

The lower traverse member 54 may be configured to move along the support posts 22. For example, the support posts 22 may extend through holes 70 disposed at opposite ends of the lower traverse member 54. As is best shown in FIG. 6, a plurality of ribs 72 may be provided that engage an exterior surface of a support post 22. The ribs 72 may extend at least partially through each hole 70 and may be spaced apart each other. Moreover, the ribs 72 may extend generally parallel to each other and parallel to a center axis of the upper portion 26 of the support post 22. In FIG. 6, three ribs 72 are shown that are disposed at a 130 degree angle relative to each other. Of course, ribs may be omitted or provided in a greater or lesser number and/or with a different special relationship in one or more embodiments of the present invention. In addition, the lower traverse member 54 may include a center portion 74 that facilitates mounting of at least a portion of the latch subsystem 62 as will be described in more detail below.

Referring again to FIGS. 4 and 5, the support frame 56 may be disposed on the lower traverse member 54. The support frame 56 may be made of any suitable material, such as a metal like an aluminum alloy. In addition, the outer cover 50 may be mounted on the support frame 56. The support frame 56 may have any suitable configuration. In the embodiment shown, the support frame 56 includes a top wall 80, a back wall 82, and one or more sets of mounting arms 84.

The top wall 80 may be generally disposed at the top of the support frame 56 and may extend generally parallel to the top of the outer cover 50. The top wall 80 may extend from an end of the back wall 82 and have a free end that extends toward and/or into the front portion 30. The top wall 80 may provide structural support at the top of the rear portion 32. One or more openings may be provided in the top wall 80 to help reduce weight and material costs.

The back wall 82 may extend generally along the back of the rear portion 32. The back wall 82 may be located between the outer cover 50 and the support posts 22. The bottom of the back wall 82 may be generally disposed behind the lower traverse member 54 in one or more embodiments of the present invention. One or more openings may be provided in the back wall 82 to help reduce weight and material costs.

One or more sets of mounting arms 84 may be provided for coupling the support frame 56 to the lower traverse member 54. In the embodiment shown, two sets of mounting arms 84 are provided that extend from the back wall 82 toward the front portion 30. Each set 84 may include one or more arms. For example, each set may include an upper arm 90 and a lower arm 92. The upper and lower arms 90, 92 may be spaced apart from each other and may extend substantially parallel to each other. The lower traverse member 54 may be disposed between the upper and lower arms 90, 92. In addition, the center portion 74 may be disposed between the sets of mounting arms 84 in one or more embodiments of the present invention. As such, the upper and lower arms 90, 92 may facilitate mounting of the support frame 56 by capturing the lower traverse member 54. In addition or alternatively, the upper arm 90, lower arm 92, and/or lower traverse member 54 may include one or more fasteners and/or include mating or mounting features that help couple the support frame 56 to the lower traverse member 54.

The upper and lower arms 90, 92 may each have distal ends that include a slot 94. The slots 94 in the upper and lower arms 90, 92 may be similarly configured and may be aligned with each other. In addition, the slots 94 may have an elongated configuration such that the slots 94 extend along a front edge of the upper and lower arms 90, 92 and substantially parallel to the upper and/or lower traverse members 52, 54. A bushing 96 may be associated with one or more slots 94 to provide a bearing surface. The bushing 96 may include an opening that has a similar configuration as an associated slot 94.

One or more arms may include a set of teeth 98. In the embodiment shown, the upper arms 90 each have a set of teeth 98 that extend along a side disposed proximate the center portion 74 of the lower traverse member 54. The set of teeth 98 may cooperate with the latch subsystem 62 to allow the front portion 30 to be secured in predetermined discrete positions.

One or more pivot members 58 may be provided that facilitate angular movement of the front portion 30. In the embodiment shown, two pivot members 58 are provided. The pivot members 58 may include features 100 such as protrusions that engage the front portion 30. In addition, the pivot members 58 may include one or more mounting features, such as a first mounting feature 102 and a second mounting feature 104. The first and second mounting features 102, 104 may be spaced apart from each other and may include first and second openings, respectively. The first and second openings may be coaxially disposed and may receive a pivot pin 110.

The support linkage 60 may be provided to help support and/or control movement of an associated pivot member 58. The support linkage 60 may be rotatably disposed on a support post 22. For example, a support linkage 60 may include a first hole that receives the support post 22 and permits rotational movement. In addition, the support linkage 60 may include a second hole that is generally disposed at an end of the support linkage 60 opposite the first hole and receives the pivot pin 110. In at least one embodiment the second end of the support linkage 60 may be disposed between the first and second mounting features 102, 104. In addition, the support linkage 60 may contact the lower traverse member 54 to transmit force between and synchronize movement of the pivot member 58 and the lower traverse member 54.

The pivot pin 110 may couple the support frame 56, pivot member 58 and support linkage 60. For example, the pivot pin 110 may extend into the slots 94 in the upper and lower arms 90, 92. The slots 94 may help constrain and guide movement of the pivot pin 110. For instance, the pivot pin 110 may slide within the slots 94 such that the pivot pin 110 is disposed near or at a first end of the slot 94 located near the center of the head restraint assembly 16 when in the retracted position as shown in FIG. 4. The pivot pin 110 may be disposed near a second end of the slot 94 that is disposed opposite the first end when in the extended position as shown in FIG. 5.

Referring to FIGS. 5 and 7-9, an embodiment of a latch subsystem 62 is shown that may be provided to help enable and disable movement of the head restraint assembly 16. More specifically, the latch subsystem 62 may move between a latched position in which movement of the head restraint assembly 16 is disabled and an unlatched position in which movement of the head restraint assembly 16 in one or more directions is enabled. In at least one embodiment, the latch subsystem 62 includes one or more coupling members, such as a first coupling member 120, a second coupling member 122, and a third coupling member 124. Alternatively, the latch subsystem may be provided with a different mechanical linkage, such as one or more cables, or with an electrical or electromechanical actuator. For instance, an electrical machine, such as a motor or solenoid, may be provided that latches or actuates a latch to enable or disable movement of the head restraint assembly 16.

The first coupling member 120 may be moveably disposed on a portion of the head restraint assembly 16, such as the lower traverse member 54. In addition, the first coupling member 120 may engage or be coupled to the button 46. For example, the first coupling member 120 may be fastened to the button 46 and lower traverse member 54 in any suitable manner, such as with a fastener or snap fit into a slot in the button 46. The first coupling member 120 may have any suitable configuration. For example, the first coupling member 120 may be provided as a wire that is formed in a generally rectangular shape in one or more embodiments of the present invention.

The second coupling member 122 may be moveably associated with the first coupling member 120. In addition, the second coupling member 122 may be adapted to permit or inhibit movement of the head restraint assembly 16. For instance, the second coupling member 122 may include a support post engagement portion 130 that disables movement along the support posts 22 when it engages a support post notch 28 and permits movement along the support posts 22 when it does not engage a notch 28. The support post engagement portion 130 may be disposed between a first end 132 and a second end 134 of the second coupling member 122 disposed opposite the first end 132. The first end 132 may be configured to engage the first coupling member 120. The second end 134 may be configured to engage the third coupling member 124. As such, the second coupling member 122 may extend from the first coupling member 120 toward the center portion 74 of the lower traverse member 54. In at least one embodiment, the second end 134 may be disposed at an angle relative to an adjacent portion of the second coupling member 122. In FIG. 7, the second end 134 is disposed at an angle that may extend downward toward the lower traverse member 54.

The second coupling member 122 may be disposed on the head restraint assembly 16 in any suitable manner. For example, a fastener 136 may be provided that couples the second coupling member 122 to the lower traverse member 54. The fastener 136 may be provided as a clip and may permit the second coupling member 122 to slide along or within the fastener 136. In addition, the second coupling member 122 may engage or be received by part of the center portion 74 to help guide its movement.

Figure 8:
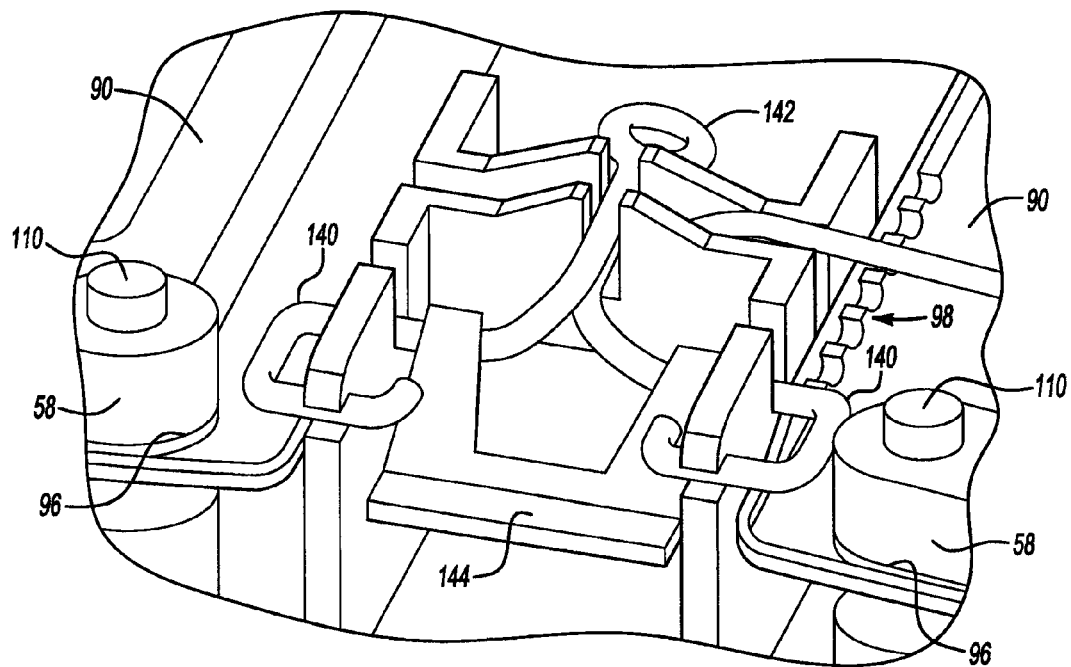
FIGS. 8 and 9 are magnified perspective views of a portion of the latch subsystem.
Figure 9:
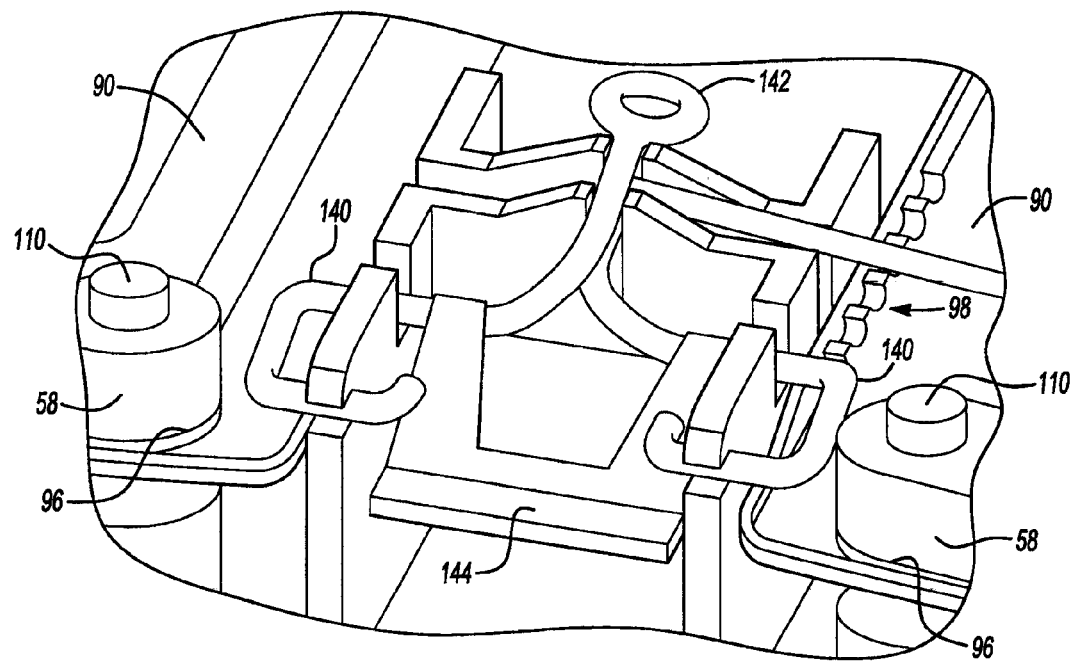

The third coupling member 124 may be moveably associated with the second coupling member 122. In addition, the third coupling member 124 may be adapted to permit or inhibit movement of the head restraint assembly 16. For instance, the third coupling member 124 may include one or more tooth engagement portions 140 that disables movement of the front portion 30 when it engages a member of the set of teeth 98 as shown in solid lines in FIG. 8. Moreover, movement of the front portion 30 may be enabled when the third coupling member 124 is disengaged from a member of the set of teeth 98 as shown in FIG. 9.

The third coupling member 124 may have any suitable configuration. In the embodiment shown in FIGS. 7-9, the third coupling member 124 is generally wishbone shaped and has an engagement portion 142 that is configured to be engaged by the second coupling member 122. The engagement portion 142 may be received by or extend through one or more slots in the center portion 74 to help position third coupling member 124. The third coupling member 124 may be generally symmetrically disposed about the engagement portion 142 and may be pivotally mounted on a portion of the head restraint assembly 16, such as the center portion 74 of the lower traverse member 54. For example, the third coupling member 124 may be pivotally disposed or snap fit into one or more slots in the center portion 74.

A spring 144 may be provided that exerts a biasing force on the third coupling member 124. The spring 144 may have any suitable configuration. In FIGS. 7-9, the spring 144 is disposed on the lower traverse member 54 and biases the third coupling member 124 toward the set of teeth 98.

Operation of the head restraint assembly 16 in accordance with at least one embodiment may be described as follows. To enable movement of the head restraint assembly 16, the button 46 may be actuated. Actuation of the button 46 may exert force on the first coupling member 120 and move the first coupling member 120 toward the second coupling member 122. Actuation of the second coupling member 122 may disengage the support post engagement portion 130 from the support post 22 to enable vertical movement. In addition, actuation of the second coupling member 122 may move second end 134 toward the third coupling member 124 to exert force on engagement portion 142. The third coupling member 124 disengages from the set of teeth 98 when the force is sufficient to overcome the biasing force of the spring 144. The front portion 30 is then free to move away from the rear portion 32, which may include linear and angular movement as previously discussed.

The head restraint assembly 16 may simultaneously move in multiple directions when the latch subsystem 62 is in the unlatched position. Such movement may be in response to force exerted by a seat occupant. Optionally, movement may be aided by or in response to force exerted by an actuator, such as an electrical or electromechanical actuator such as a motor, solenoid, spring, linkage, or the like.

Movement of the head restraint assembly 16 may be disabled when the latch subsystem 62 is in the latched position. For instance, the spring 144 may bias the third coupling member 124 into engagement with the set of teeth 98, bias the third coupling member 124 against the second coupling member 122 to actuate the second coupling member 122 against the support post 22, and bias the second coupling member 122 against the first coupling member 120 to return the button 46 and latch subsystem 62 to the latched position when a sufficient countervailing force is not provided.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly comprising:
   a seat back;
   a support post fixedly disposed on the seat back;
   a headrest for supporting the head of a seat occupant, the headrest being moveably disposed on the support post and having a first traverse member that receives the support post and a support frame moveably disposed on the first traverse member that is spaced apart from the support post and that includes a set of teeth; and
   a latch mechanism at least partially disposed within the headrest, the latch mechanism being moveable between a latched position in which a coupling member that is pivotally disposed on the first traverse member is received by the set of teeth and an unlatched position in which the coupling member is not received by the set of teeth;
   wherein the headrest is simultaneously moveable in multiple directions when the latch mechanism is disposed in the unlatched position.

2. The seat assembly of claim 1 wherein the headrest is moveable in a first direction along the support post and moveable in a second direction away from the support post when the latch mechanism is in the unlatched position.

3. The seat assembly of claim 1 wherein the headrest includes a front portion and a rear portion, wherein the rear portion moves along the support post, the front portion moves away from the rear portion, and a front surface of the front portion flexes from a first position to a second position that differs from the first position when the latch mechanism is in the unlatched position.

4. The seat assembly of claim 1 wherein movement of the headrest is inhibited when the latch mechanism is in the latched position.

5. The seat assembly of claim 1 wherein the first traverse member is moveably disposed on the support post.

6. The seat assembly of claim 1 wherein the first traverse member includes a hole that receives the support post.

7. The seat assembly of claim 1 wherein the support frame has an upper arm and a lower arm, wherein the first traverse member is disposed between the upper and lower arms.

8. The seat assembly of claim 7 wherein the coupling member is pivotally disposed on the first traverse member above the upper arm.

9. A seat assembly comprising:
   a seat back;
   a support post disposed on the seat back;
   a headrest moveably disposed on the support post; and
   a latch mechanism at least partially disposed in the headrest and moveable between a latched position and an unlatched position, the latch mechanism including:
   a first coupling member;
   a second coupling member that engages the first coupling member and is configured to disengage the support post when in the unlatched position; and
   a third coupling member that engages the second coupling member and is configured to disengage a member of a set of teeth disposed on a support frame of the headrest when in the unlatched position;
   wherein the second coupling member inhibits movement of the headrest along the support post and the third coupling member inhibits movement of the headrest away from the support post when the latch mechanism is in the latched position.

10. The seat assembly of claim 9 wherein the second coupling member is spaced apart from the support post and pivots the third coupling member when the latch mechanism is moved to the unlatched position.

11. The seat assembly of claim 9 wherein the second coupling member includes an end disposed at an angle relative to an adjacent portion of the second coupling member, wherein the end slides under the third coupling member to rotate the third coupling member when the latch mechanism is in the unlatched position.

12. The seat assembly of claim 9 further comprising a lower traverse member moveably disposed on the support post, wherein the first, second, and third coupling members are moveably disposed on the lower traverse member.

13. The seat assembly of claim 9 wherein the latch mechanism further comprises a button disposed on the headrest that actuates the first coupling member when the latch mechanism moves from the latched position to the unlatched position.

14. The seat assembly of claim 9 further comprising a spring that exerts a biasing force on the third coupling member to bias the latch mechanism toward the latched position.

15. The seat assembly of claim 14 wherein the spring is disposed on a lower traverse member that is moveably disposed on the support post.

16. The seat assembly of claim 9 further comprising a lower traverse member moveably disposed on the support post wherein the third coupling member is pivotally disposed on the lower traverse member between first and second arms of the support frame.

17. A seat assembly comprising:
    a seat back;
    a support post disposed on the seat back;
    a latch mechanism moveable between a latched position and an unlatched position; and
    a headrest for supporting the head of a seat occupant, the headrest including a front portion moveably coupled to a rear portion, the rear portion including:
    a lower traverse member moveably disposed on the support post;
    a support frame disposed on the lower traverse member, the support frame having a pair of mounting arms, wherein the lower traverse member is disposed between the pair of mounting arms;

a pivot member moveably disposed on the pair of mounting arms; and a support linkage rotatably disposed on the support post between the pair of mounting arms and coupled to the pivot member;

wherein the lower traverse member, pivot member and support linkage do not move when the latch mechanism is disposed in the latched position and the headrest is simultaneously moveable in multiple directions when the latch mechanism is disposed in the unlatched position.

18. The seat assembly of claim 17 wherein the pivot member and support linkage are free to rotate when the latch mechanism is disposed in the unlatched position.

19. The seat assembly of claim 17 further comprising a pivot pin that extends through the pivot member, the support linkage, and a slot.

20. The seat assembly of claim 19 wherein the pivot pin is disposed near a first end of the slot when the front portion is in a retracted position and disposed near a second end of the slot disposed opposite the first end when the front portion is disposed in an extended position.

\* \* \* \* \*